US010327579B2

(12) United States Patent
Shi et al.

(10) Patent No.: US 10,327,579 B2
(45) Date of Patent: Jun. 25, 2019

(54) COFFEE MACHINE WITH MILK FROTHER PARTS

(71) Applicant: Ningbo Jinyu Electric Appliance Co., Ltd., Zhejiang (CN)

(72) Inventors: Zhongyu Shi, Zhejiang (CN); Junda Shi, Zhejiang (CN); Shukuo Liu, Zhejiang (CN)

( * ) Notice: Subject to any disclaimer, the term of this patent is extended or adjusted under 35 U.S.C. 154(b) by 448 days.

(21) Appl. No.: 15/336,798

(22) Filed: Oct. 28, 2016

(65) Prior Publication Data
US 2018/0049584 A1    Feb. 22, 2018

(30) Foreign Application Priority Data

Aug. 19, 2016  (CN) .......................... 2016 1 0715413

(51) Int. Cl.
| A47J 31/44 | (2006.01) |
| A47J 43/07 | (2006.01) |
| A47J 43/10 | (2006.01) |
| A47J 31/057 | (2006.01) |

(52) U.S. Cl.
CPC ......... *A47J 31/4489* (2013.01); *A47J 31/057* (2013.01); *A47J 43/0716* (2013.01); *A47J 43/1093* (2013.01)

(58) Field of Classification Search
CPC .. A47J 31/4489; A47J 31/057; A47J 43/0716; A47J 31/3628; A47J 43/1093
USPC ............................ 99/277.2, 289 D, 295, 293
See application file for complete search history.

(56) References Cited

U.S. PATENT DOCUMENTS

| 5,318,703 A * | 6/1994 | Heiligman | A47J 31/605 210/264 |
| 5,370,041 A * | 12/1994 | Lowe | A47J 31/605 210/282 |
| 5,393,548 A * | 2/1995 | Heiligman | A47J 31/605 210/264 |
| 5,411,661 A * | 5/1995 | Heiligman | A47J 31/605 210/264 |
| 6,103,116 A * | 8/2000 | Koslow | A47J 31/06 210/282 |
| 6,345,570 B1 * | 2/2002 | Santi | A47J 31/368 99/289 R |
| 7,252,035 B2 * | 8/2007 | Lin | A47J 31/0663 99/295 |
| 7,650,832 B2 * | 1/2010 | Magg | A47J 31/3685 99/289 R |
| 7,673,558 B2 * | 3/2010 | Panesar | A47J 31/0673 99/275 |
| 7,681,492 B2 * | 3/2010 | Suggi Liverani | B65D 85/8043 426/115 |

(Continued)

*Primary Examiner* — Jimmy Chou
(74) *Attorney, Agent, or Firm* — Prakash Nama; Global IP Services, PLLC

(57) ABSTRACT

A coffee machine with milk frother parts, having an upper body, an inner frame on the upper body, a water gauge in the inner frame, a brewing frame on the inner frame, a piercing pin fixing unit on the brewing frame, an upper piercing pin on the piercing pin fixing unit, a pierced location sealing rubber on the upper piercing pin, a brewing upper cover on the inner frame, a button slot at a frontal surface of the brewing upper cover, a button in the button slot, a locking element provided at a middle section of a front upper part of the brewing frame and connected on the button.

3 Claims, 4 Drawing Sheets

(56) References Cited

U.S. PATENT DOCUMENTS

| | | | | |
|---|---|---|---|---|
| 7,815,953 | B2* | 10/2010 | Mastropasqua | B65D 85/8043 426/433 |
| 9,919,245 | B2* | 3/2018 | Beyda | B01D 29/085 |
| 2009/0266239 | A1* | 10/2009 | Noordhuis | A47J 31/0647 99/295 |
| 2011/0023723 | A1* | 2/2011 | Morin | A47J 31/4489 99/323.3 |
| 2013/0220141 | A1* | 8/2013 | Guo | A47J 31/06 99/300 |
| 2015/0125586 | A1* | 5/2015 | Ergican | A47J 31/407 426/590 |
| 2016/0183717 | A1* | 6/2016 | Ostan | A47J 31/10 99/280 |
| 2017/0233178 | A1* | 8/2017 | Lo Faro | A47J 31/401 99/295 |

* cited by examiner

COFFEE MACHINE WITH MILK FROTHER PARTS

BACKGROUND OF THE INVENTION

The present invention relates to the technical field of coffee machine, and more specifically relates to a coffee machine with milk frother parts.

Along with the development of the society, people are now enjoying increasingly high living standards. People are now chasing for more high-end leisure activities. Coffee appreciation has become a kind of leisure and relaxing life style. Conventionally, a cup of coffee is prepared via processes like manual grinding, or a coffee machine is used. Most people like to add milk into the coffee. However, a traditional coffee machine and a traditional milk frother are two separate machines. Therefore, they do not promote convenient use, and their working efficiency is low.

BRIEF SUMMARY OF THE INVENTION

In view of the aforesaid disadvantages now present in the prior art, the present invention provides a kind of coffee machine with milk frother parts. The present invention has a simple structure and a reasonable design and promotes convenient use. The present invention has a simple structure that integrates a milk frother, a coffee maker and heating parts. After automatic milk frothing, the heating parts will start to brew the coffee automatically. As such, the present invention has significantly enhanced working efficiency.

A coffee machine with milk frother parts, comprising an upper body; an inner frame is provided on the upper body; a water tank water gauge is provided inside the inner frame; a brewing frame is provided on the inner frame; a piercing pin fixing part is provided on the brewing frame; an upper piercing pin is provided on the piercing pin fixing part; a pierced location sealing rubber is provided on the upper piercing pin; a brewing upper cover is disposed on the inner frame; a frontal surface of the brewing upper cover is provided with a button slot; a button is provided inside the button slot; a locking element provided at a middle section of a front upper part of the brewing frame is connected on the button; the upper body is mounted on a lower body; the lower body is formed by a base and a curved shape tubular sleeve positioned on the base; a middle section of the base has a circular slot; a front part of the base is provided with button slots; a surface of the tubular sleeve has a curved recess which recesses inwardly; coffee heating parts are provided inside the tubular sleeve; a bottom surface of the lower body is provided with a bottom cover; a frame is provided inside the circular slot of the lower body; a circular upright frame is provided at a middle part of a surface of the frame; a fan seat, magnets on the fan seat, and a fan on the magnets are sequentially provided on the circular upright frame; a heating tube is provided on the frame; a heating plate is provided on the heating tube; a middle part of the heating plate has a hole; an O shape sealing ring is provided on the heating plate; a heat insulating ring is provided on the O shape sealing ring; a stainless steel ring is provided on the hole of the heating plate; a front surface of the bottom cover is provided with a PCB frame; a PCB button panel is provided on the PCB frame; buttons are provided on the PCB button panel; the buttons protrude out of the button slots at the front part of the base to an external environment; a motor is provided on the PCB button panel; a motor shaft of the motor passes through the circular upright frame at the middle part of the frame and also passes through the fan seat; the fan sleeves the motor shaft of the motor; two sides of the PCB button panel are provided with temperature control units respectively; a glass mug seat is mounted on the circular slot at the middle part of the base of the lower body; a middle part of a bottom surface of the glass mug seat is provided with a rotation shaft; an engagement end at a bottom part of the rotation shaft engages with a hole at the motor shaft of the motor; a glass mug inner seat is provided on the glass mug seat; a glass mug is positioned on the glass mug inner seat; a milk frothing unit is mounted inside the glass mug; the milk frothing unit is connected with the rotation shaft; a coffee material container is provided on the inner frame; a filter cup is provided on the coffee material container.

Further, the upper body is sleeved by a decoration panel.

Further, a bottom surface of the bottom cover is provided with leg pads.

The present invention has the following beneficial effects by adopting the above structures: a coffee machine with milk frother parts integrating a coffee maker, a milk frother and heating parts; its structure is simple; after automatic milk frothing, coffee brewing can be automatically achieved by the heating parts. Therefore, the present invention has significantly enhanced working efficiency.

BRIEF DESCRIPTION OF THE DRAWINGS

The drawings described herein are part of the invention for further understanding of the present invention, and should not constitute any improper limitation to the present invention.

REFERENCE IN THE FIGURES

1: water tank cover; 2: brewing upper cover; 3: button; 4: locking element; 5: brewing frame; 6: upper piercing pin; 7: pierced location sealing rubber; 8: piercing pin fixing part; 9: water tank water gauge; 10: inner frame; 11: upper body; 12: decoration panel; 13: coffee heating parts; 14: lower body; 15 stainless steel ring; 16: heat insulating ring; 17: O shape sealing ring; 18: heating plate; 19: heating tube; 20: fan; 21: magnets; 22: fan seat; 23: frame; 24: temperature control units; 25: motor; 26: PCB button panel; 27: PCB frame; 28: buttons; 29: bottom cover; 30: leg pads; 31: filter cup; 32: coffee material container; 33 milk frothing unit; 34: glass mug; 35: glass mug inner seat; 36: glass mug seat; 37: rotation shaft; 38: coffee machine body.

DETAILED DESCRIPTION OF THE INVENTION

The present invention will be described in detail below with reference to an embodiment and the accompanying figures. The illustrative embodiment and the description are intended only for the understanding of the present invention and should not limit the present invention.

Figure 1:
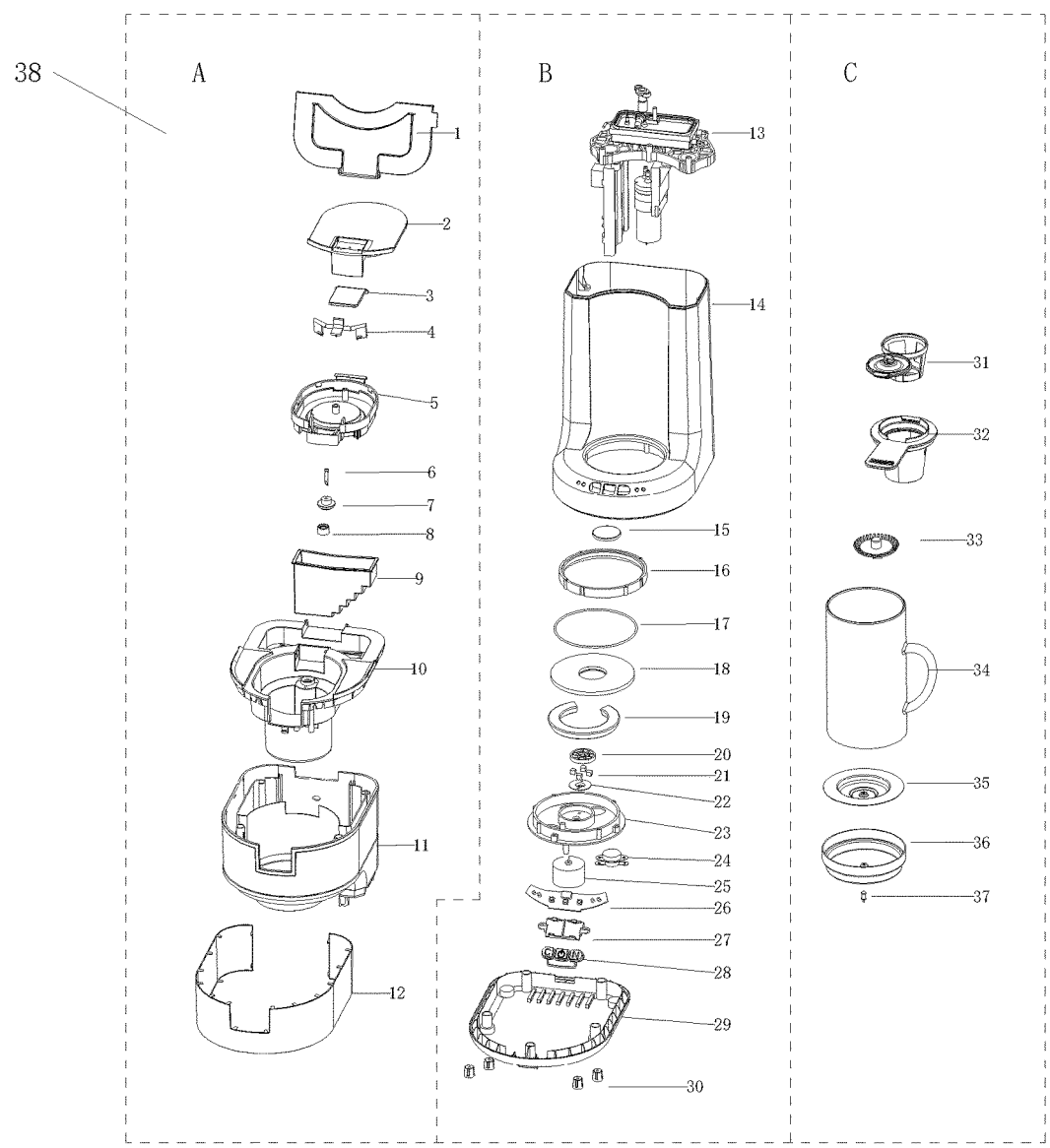
FIG. 1 is an exploded view of a structure of the present invention.
Figure 2:
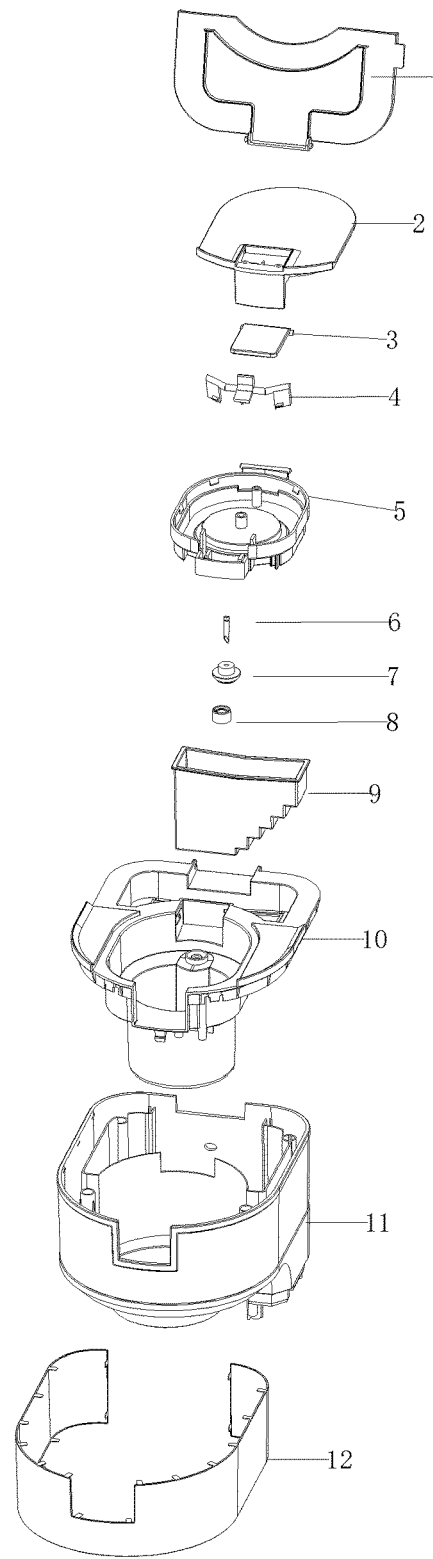
FIG. 2 is an enlarged view of portion A shown in FIG. 1.
Figure 3:
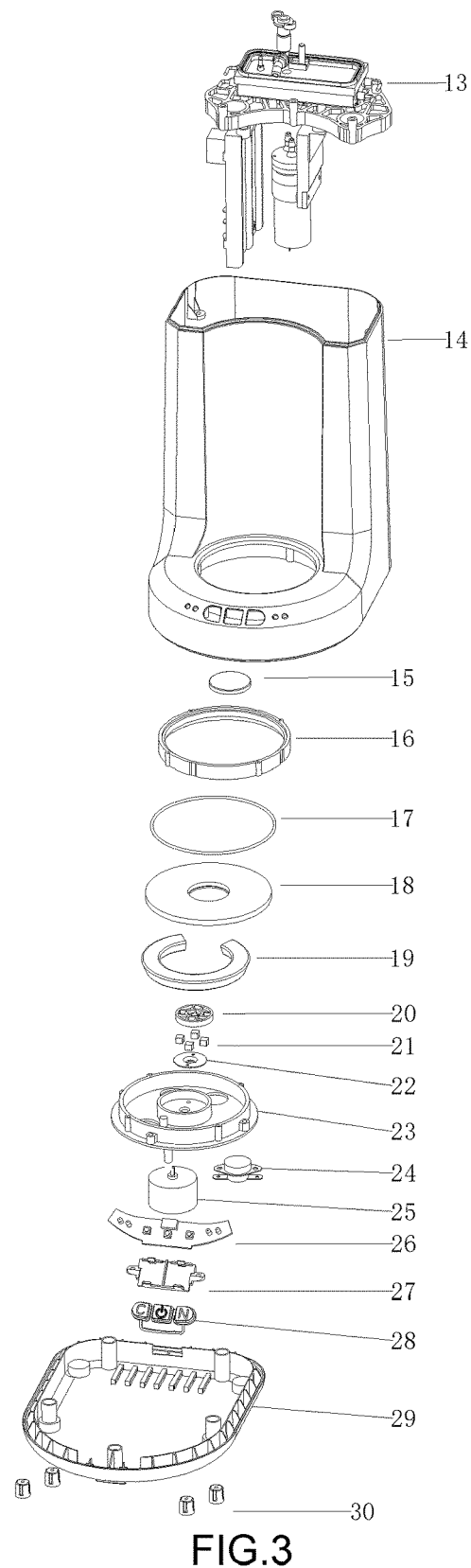
FIG. 3 is an enlarged view of portion B shown in FIG. 1.
Figure 4:
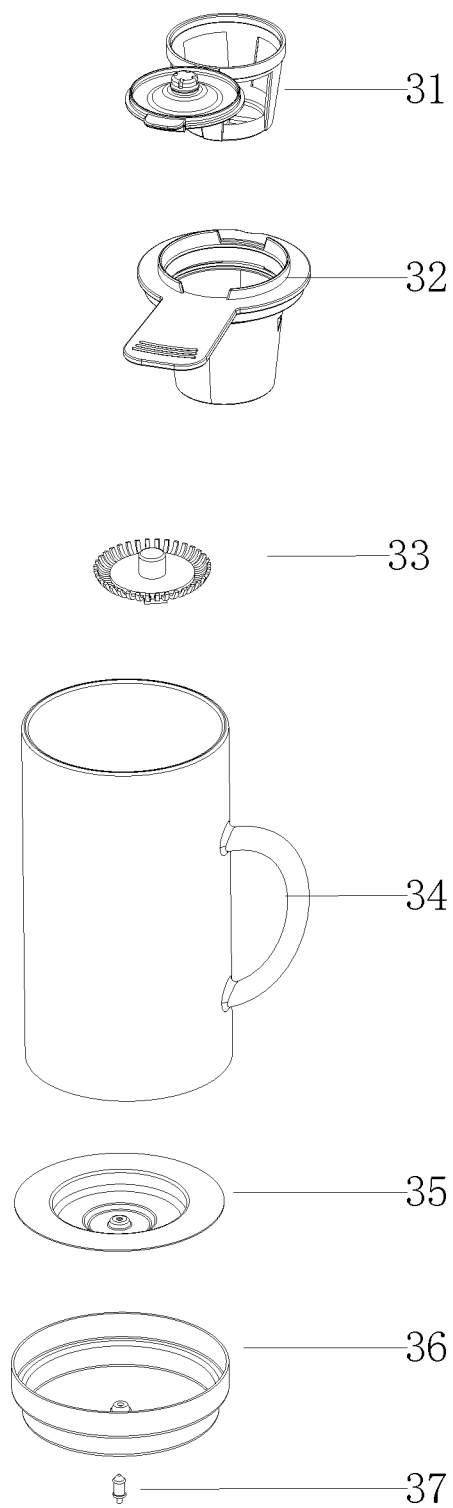
FIG. 4 is an enlarged view of portion C shown in FIG. 1.

As shown in FIGS. 1-4, a coffee machine with milk frother parts comprises a coffee machine body 38; the coffee machine body 38 comprises an upper body 11; an inner frame 10 is provided on the upper body 11; a water tank water gauge 9 is provided inside the inner frame 10; a brewing frame 5 is provided on the inner frame 10; a piercing pin fixing part 8 is provided on the brewing frame 5; an upper piercing pin 6 is provided on the piercing pin fixing part 8; a pierced location sealing rubber 7 is provided on the upper piercing pin 6; a brewing upper cover 2 is disposed on the inner frame 10; a frontal surface of the brewing upper cover 2 is provided with a button slot; a button 3 is provided inside the button slot; a locking element 4 provided at a middle section of a front upper part of the brewing frame 5 is connected on the button 3; the upper body 11 is mounted on a lower body 14; the lower body 14 is formed by a base and a curved shape tubular sleeve positioned on the base; a middle section of the base has a circular slot; a front part of the base is provided with button slots; a surface of the tubular sleeve has a curved recess which recesses inwardly; coffee heating parts 13 are provided inside the tubular sleeve.

A bottom surface of the lower body 14 is provided with a bottom cover 29.

A frame 23 is provided inside the circular slot of the lower body 14; a circular upright frame is provided at a middle part of a surface of the frame 23; a fan seat 22, magnets 21 on the fan seat 22, and a fan 20 on the magnets 21 are sequentially provided on the circular upright frame; a heating tube 19 is provided on the frame 23; a heating plate 18 is provided on the heating tube 19; a middle part of the heating plate 18 has a hole; an O shape sealing ring 17 is provided on the heating plate 18; a heat insulating ring 16 is provided on the O shape sealing ring 17; a stainless steel ring 15 is provided on the hole of the heating plate 18.

A front surface of the bottom cover 29 is provided with a PCB frame 27; a PCB button panel 26 is provided on the PCB frame 27; buttons 28 are provided on the PCB button panel 26; the buttons 28 protrude out of the button slots at the front part of the base to an external environment; a motor 25 is provided on the PCB button panel 26; a motor shaft of the motor 25 passes through the circular upright frame at the middle part of the frame 23 and also passes through the fan seat 22; the fan 20 sleeves the motor shaft of the motor 25; two sides of the PCB button panel 26 are provided with temperature control units 24 respectively.

A glass mug seat 36 is mounted on the circular slot at the middle part of the base of the lower body 14; a middle part of a bottom surface of the glass mug seat 36 is provided with a rotation shaft 37; an engagement end at a bottom part of the rotation shaft 37 engages with a hole at the motor shaft of the motor 25; a glass mug inner seat 35 is provided on the glass mug seat 36; a glass mug 34 is positioned on the glass mug inner seat 35; a milk frothing unit 33 is mounted inside the glass mug 34; the milk frothing unit 33 is connected with the rotation shaft 37.

A coffee material container 32 is provided on the inner frame 10; a filter cup 31 is provided on the coffee material container 32.

Preferably, the upper body 11 is sleeved by a decoration panel 12.

Preferably, a bottom surface of the bottom cover 29 is provided with leg pads 30.

According to the present invention, the coffee machine body 38 comprises coffee machine parts additionally mounted with milk frother parts. The milk frother parts comprises the milk frothing unit 33, the glass mug 34, the glass mug inner seat 35, the glass mug seat 36, and the rotation shaft 37. The glass mug inner seat 35 is provided on the glass mug seat 36; the glass mug 34 is placed in the glass mug inner seat 35; the milk frothing unit 33 is mounted inside the glass mug 34, and is connected with the rotation shaft 37 at the bottom surface of the glass mug seat 36. The rotation shaft 37 is mounted on the motor shaft of the motor 25.

During use, coffee materials are poured into the filter cup 31, which is then placed in the coffee material container 32. Heating is carried out by the coffee heating parts 13. When brewed coffee liquid drips into the glass mug 34, the milk frother parts start working to add milk into the glass mug 34. Rotation of the motor 25 drives the milk frothing unit 33 to mix the milk and coffee to obtain milk coffee. The present invention is convenient to use due to automatic mixing and blending, and thus significantly increases working efficiency.

The above description illustrates only a preferred embodiment, of the present invention. Any changes or modification with equivalent effect made within the scope of the present invention with respect to the structures, features or principles of the present invention should also fall within the scope of the present invention.

What is claimed is:

1. A coffee machine with milk frother parts, comprising an upper body; an inner frame is provided on the upper body; a water tank water gauge is provided inside the inner frame; a brewing frame is provided on the inner frame; a piercing pin fixing part is provided on the brewing frame; an upper piercing pin is provided on the piercing pin fixing part; a pierced location sealing rubber is provided on the upper piercing pin; a brewing upper cover is disposed on the inner frame; a frontal surface of the brewing upper cover is provided with a button slot; a button is provided inside the button slot; a locking element provided at a middle section of a front upper part of the brewing frame is connected on the button; the upper body is mounted on a lower body; the lower body is formed by a base and a curved shape tubular sleeve positioned on the base; a middle section of the base has a circular slot; a front part of the base is provided with button slots; a surface of the tubular sleeve has a curved recess which recesses inwardly; coffee heating parts are provided inside the tubular sleeve; a bottom surface of the lower body is provided with a bottom cover; a frame is provided inside the circular slot of the lower body; a circular upright frame is provided at a middle part of a surface of the frame; a fan seat, magnets on the fan seat, and a fan on the magnets are sequentially provided on the circular upright frame; a heating tube is provided on the frame; a heating plate is provided on the heating tube; a middle part of the heating plate has a hole; an O shape sealing ring is provided on the heating plate; a heat insulating ring is provided on the O shape sealing ring; a stainless steel ring is provided on the hole of the heating plate; a front surface of the bottom cover is provided with a PCB frame; a PCB button panel is provided on the PCB frame; buttons are, provided on the PCB button panel; the buttons protrude out of the button slots at the front part of the base to an external environment; a motor is provided on the PCB button panel; a motor shaft of the motor passes through the circular upright frame at the middle part of the frame and also passes through the fan seat; the fan sleeves the motor shaft of the motor; two sides of the PCB button panel are provided with temperature control units respectively; a glass mug seat is mounted on the circular slot at the middle part of the base of the lower body; a middle part of a bottom surface of the glass mug seat is provided with a rotation shaft; an engagement end at a bottom part of the rotation shaft engages with a hole at the motor shaft of the motor; a glass mug inner seat is provided on the glass mug seat; a glass mug is positioned on the glass mug inner seat; a milk frothing unit is mounted inside the glass mug; the milk frothing unit is connected with the rotation shaft; a coffee material container is provided on the inner frame; a filter cup is provided on the coffee material container.

2. The coffee machine with milk frother parts as in claim 1, wherein the upper body is sleeved by a decoration panel.

3. The coffee machine with milk frother parts as in claim 1, wherein a bottom surface of the bottom cover is provided with leg pads.

* * * * *